Feb. 3, 1931. E. WILLIAMS 1,790,964
TREPAN TOOL WITH RADIAL CAGE, CUTTER AND GUIDE
Filed March 17, 1927 4 Sheets-Sheet 1

Witness.
*m Rolls*

INVENTOR.
*Ernest Williams*
By *William E. P. Bayly*
*His Attorney*

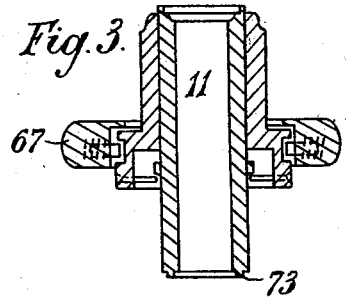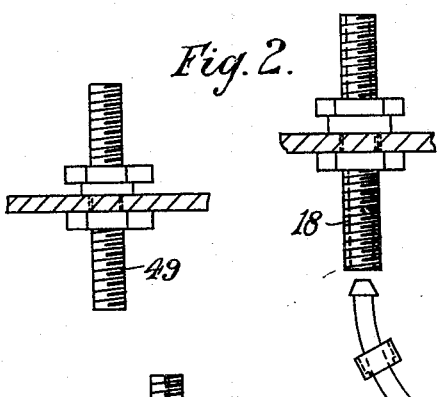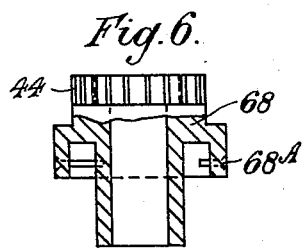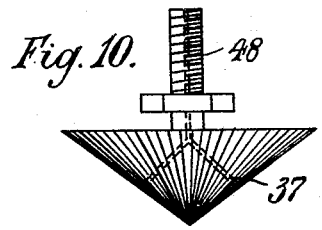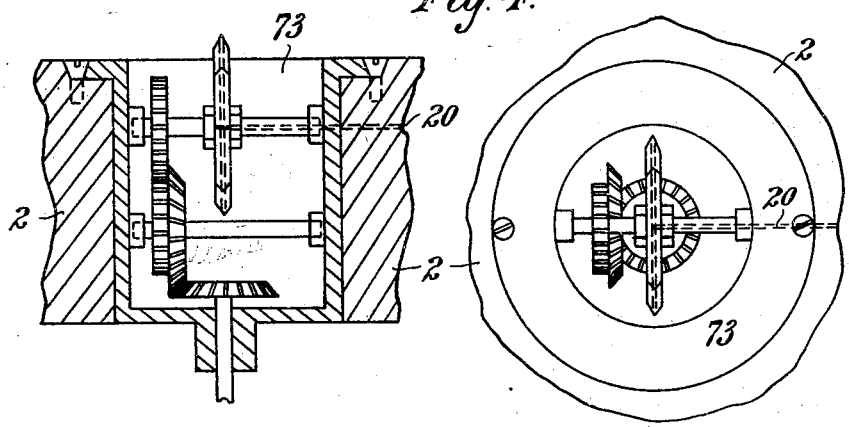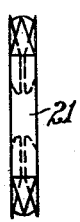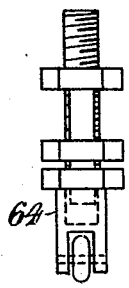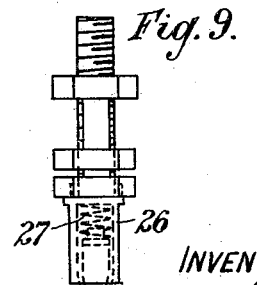

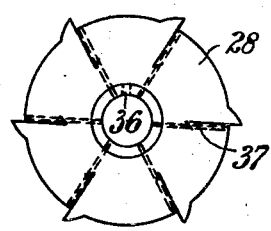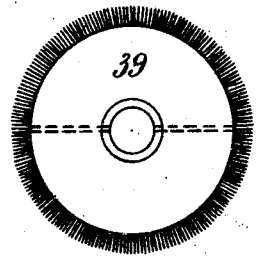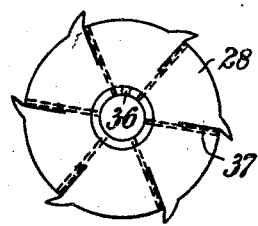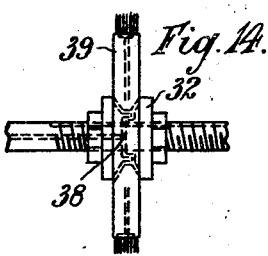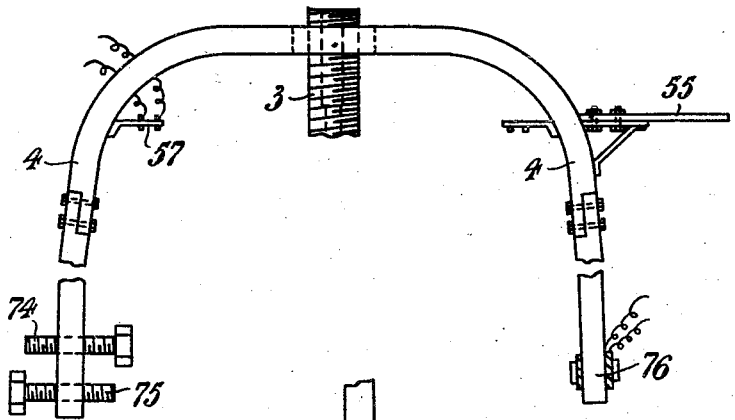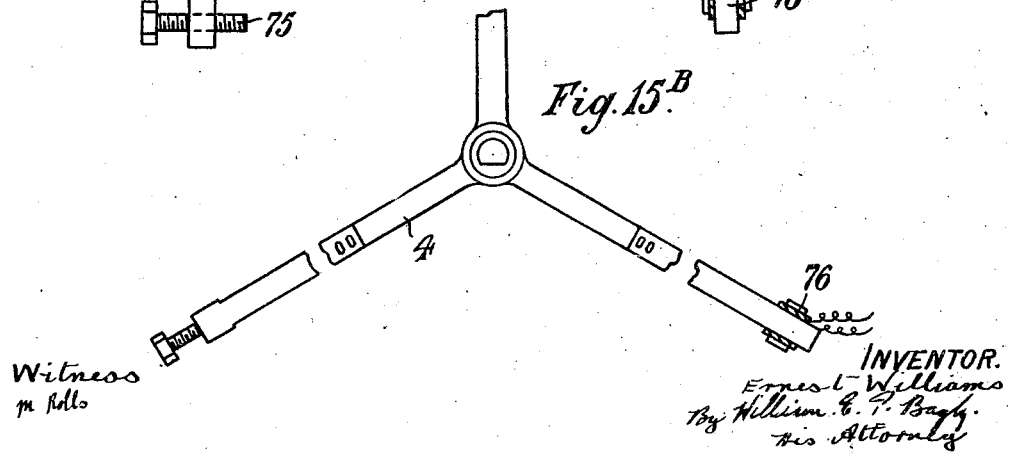

Patented Feb. 3, 1931

1,790,964

UNITED STATES PATENT OFFICE

ERNEST WILLIAMS, OF STONE, ENGLAND

TREPAN TOOL WITH RADIAL CAGE, CUTTER, AND GUIDE

Application filed March 17, 1927, Serial No. 176,248, and in Great Britain March 13, 1926.

This invention is a male trepan organic machine and tool for cutting, boring, grinding, grooving, slotting, rifling, lapping, polishing or the like any substance or material, being an improvement of the trepan tool described in my United States patent application 142,131, by means of a geared rotary sliding body carrying plain or toothed cutter or cutters that may be simultaneously geared to a non-rotary geared abutment constrained to move in a mechanical path according to the gearing engaged whilst being simultaneously rotated positively about their own axes whilst they may also be simultaneously receiving a planetary like motion around an axis; the said machine comprising a rotary cage or body wherein or whereon the cutter or cutters are mounted.

The complete machine including abutment gearing with power unit in self-contained form may be attached internally or externally to the material engaged.

Examples of the invention are represented by the accompanying three sheets of drawings.

Fig. 2 shows three types of detachable centre points.

Fig. 3 shows one form of detachable external coupling for flexible shaft and the like, when power is externally supplied.

Fig. 4 shows adjustable rotary cage control for cutter and gearing.

Fig. 6 shows housing coupling interchangeable with Fig. 3.

Fig. 7 shows amplifying teeth of cutter grouped as one cutter.

Fig. 8 shows detachable depth guides.

Fig. 9 shows mechanical lubricator.

Fig. 10 shows a rotary convex cutter.

Fig. 11 shows two forms of rotary cutter with channels for lubricant and cooling.

Fig. 12 shows group of four rotary amplifying cutters.

Fig. 14 shows rotary wire brush.

Figs. 15A and 15B show one method of mounting rotary cutter or brush on hollow driving shaft.

Fig. 16 shows a side view of the brush shown in Fig. 14.

Figure 1:
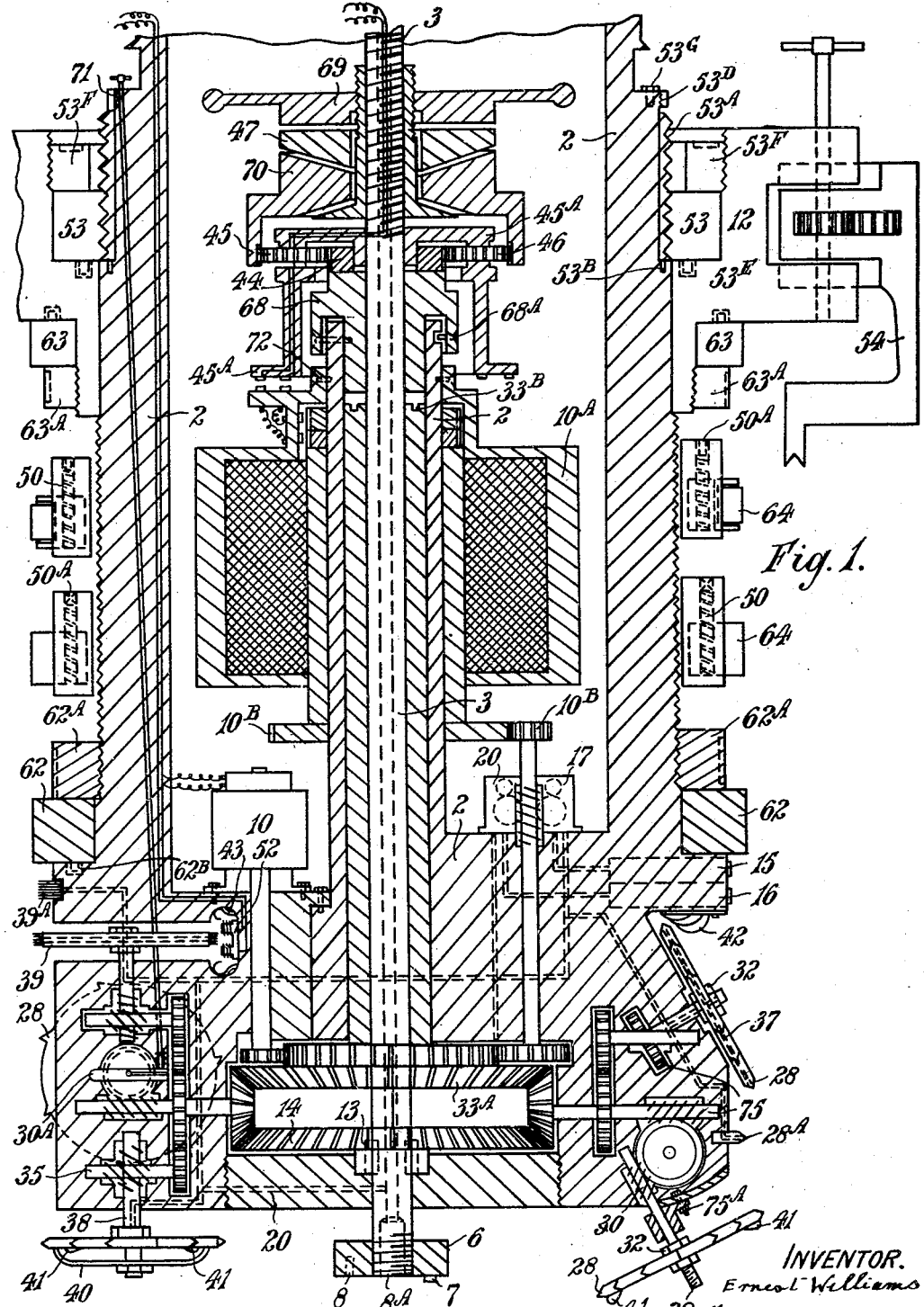
Fig. 1 is a general view, sectional elevation showing structure of invention.
Figure 5:
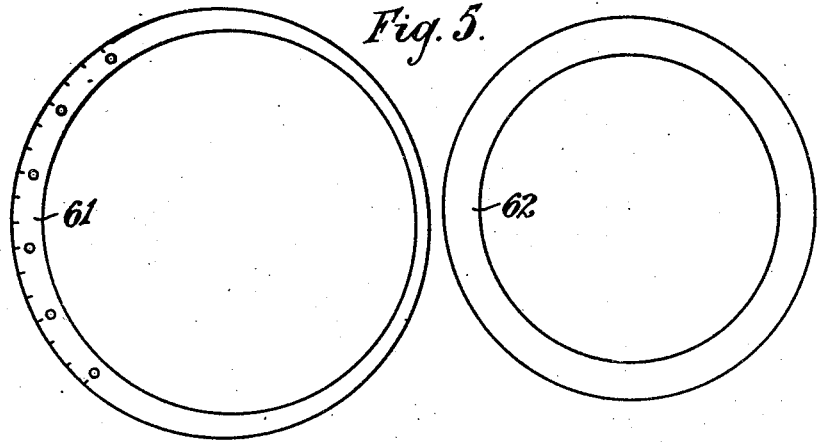
Fig. 5 shows sliding adjustable eccentric guiding ring and plain detachable ring.

The structure is a rotary like body (2) with a cutter or cutters and a guide or guides, carried therein or thereon. When the tool rotates on its own axis (3) one or both ends of the said axis to be made a fixture to the material engaged. One end of said axis (3) has a detachable non-rotating carrier guide (4, Fig. 16). The other end of axis (3) may have a platform (6, Fig. 1) detachable or otherwise, which may be on the centre of said material, the said platform may have projections (7) or recesses (8 and 8A) to receive detachable sliding or screw centre points (18, 48 and 49, Fig. 2), bolts, pins or studs, (66) and attachments to prevent rotation and for fixing the tool to the said material. The main rotary body (2) may have attached or fixed to it gears and shafts, driven by hand or power mechanism rotating the said body (2).

Attached to the screw centre point (48) is a convex rotary cutter (37 Fig. 10) for boring into the work being operated upon for the purpose of securing the tool to the material to be engaged.

The power for working the said tool may be by one or any number of motors or the like,—two being shown, (10 and 10A)—in self-contained form, or power may be externally attached or supplied. The motor (10) may be fitted in the main rotary body and rotate with that body. The motor (10A) has an armature that is built on a hollow axis or tube, said armature being connected by gearing (10B) or the like to the cutters. The motor may be detachable and fitted to the main body (2) by screws or the like. One kind of external power coupling attachment is shown (11, Fig. 3) with free wheel ratchet attachment for hand grip (67), so controlling direction of rotation of the main body.

Said coupling (11, Fig. 3) being interchangeable with housing (68, Figs. 1 and 6) dogs (73) engaging with recess (33B, Fig. 1). I do not confine myself to this particular form of coupling when using external motive power, but may use any suitable common form of transmission, I do not confine myself to one form of motor power only, any common kind of motive power may be used, with any common kind of bevel, angular or straight toothed gearing and attachment, in self-contained form rotating with the trepan tool or externally attached, or the tool may be rotated in one mass by any form of external means. The tool may be composed of one or any number of bodies, three being shown. One body (12) to carry the floating guiding and rifling feed gearing (53, Fig. 1). The second main sliding rotary body (2) to carry the cutters, shafts and gearing and other attachments. The third axial body (3) to form a centre for the tool to revolve on or revolve with. The said axis (3) may be keyed (13) to the gear wheel (14) in a sliding detachable manner. I do not confine myself to this particular method of bearings, gearings or couplings connecting the bodies and axis and shafts, but may use any suitable common form of bearing, gearing and coupling, with or without a keyed axis for abutment gearing.

The trepan tool may have its own oil (15) and cooling (16) supply tanks, self-contained and may be connected to pumps (17) or the like, built in and driven within the body for regulation of discharge. Said tanks or cutters may be externally supplied through the detachable hollow axis (3) and hollow pivot (18, Fig. 2) attached to platform (6) in recesses (8A) and connected to channels (20, Fig. 1) or the like in or on the main body (2). The adjustable tool holders (23) and sockets may have grooves, channels and portholes to correspond with channels (20, Fig. 1) in main body (2), to receive cooling fluid or substance for discharge on cutting surface path of material and cutting edge of cutters. One form of forced lubrication to the cutting path is in solid form, blocks of lubricant like soap, (25, Fig. 9), bar pattern, mounted and sliding in a holder (26) in sockets and kept in position by springs (27) or the like for frictional contact as the tool moves over the surface engaged.

The rotary cutter or cutters (28, Figs. 1, 11 and 12) may be in solid form integral with their shafts, for instance—like drills—or they may be mounted on axle shafts (29) or spindles (30), one or any number of shafts and cutters may be fitted and used, and one or any number of cutters may be used at any one time, they may be mounted on axle shafts (29) in a sliding variable manner by means of threads and nuts (32) and the like for adjustment of the distance of cutter (28) to the centre of rotation or pivot axis, and so vary the bore or depth of cut taken, by varying the distance of the cutter (28) from the centre or rotation (3) or pivot; or fixed cutters (28A) may be mounted direct in the geared housing or in adjustable holders (23) attached to the geared housing so forming a rotary cutter when the main body is being rotated by the internal gearing.

The cutters may be rotated by single or compound motion, the first motion, the cutter or cutters being carried on or in the main body (2) and rotated freely within that body (2) by removing gear wheel (14) or the locking sliding key (13, Fig. 1) and allowing all internal gearing to run free. The compound motion is caused by the main body (2) being geared to the power unit (33) and being geared to the non-rotary axis (3) gearing (14) and being geared to the driving shafts (29) carrying the cutters at the same time, and so they receive rotary movements simultaneously, that is, a rotating cutter on a rotating body rotating at any speed desired according to their gear ratio within the main rotating body (2) which carries them one in relation to the other, (Fig. 1).

The cutters may be rotated in either direction through lay-shaft gearing or like reversing gear. It should be noted that the shafts on or by which the cutters are mounted may be rotated at any desired speed in relation to the speed of rotation of the main body by suitably designing the gears which connect said shafts, body and axis. I do not confine myself to always use compound motions for the rotary cutter, said cutter may be driven direct from the central gear (33A) within the main body, without engaging abutment gearing. The main body (2) may be revolved by hand or other means, by allowing gearing or central axis (3) to rotate independently of each other. Cutters, amplifying or otherwise, and shafts (29) or spindles (30) may be set and rotated at any designed angle in relation to the central axis (3) and the main body (2) and at different angles, one in relation to the other according to the requirements of material engaged upon, by using common worm or skew gearing (75, Fig. 1) or the like, mounted in any common form of swivel housing or direct in the main body. Rotary cutters may revolve with shafts (29) or on spindles (30) or the like, in any direction in relation to the main body and their directions of rotation may be reversed, one in relation to the other, by the use of lay-shafts (35) and the like. The amplifying cutters will be fitted and carried by the main rotary body and each may have its own separate surface to cut according to its shape and position whilst rotating in the same path or groove so that the final shape of the groove is produced in stages. The teeth being shaped for a definite numerical position one in relation to the other and placed in rotation in an amplifying and enlarging manner.

Rotary cutters have a keyway (36, Fig. 11), or hollow recess (36). Each cutter having a definite relation one to another, and so definitely place the cutting edge of one cutter to correspond with the designed amplifying cutting edge position of the next cutter, when placed on driving shaft (29) or spindle (30) all working and travelling in their appointed path and cutting in stages making one groove or path in an amplifying manner all being mounted in the rotary body (2) and rotated in unity. For example—first cutter, pointed groover—second cutter, round groover—third cutter, right angle groover—fourth cutter, left angle groover. I do not confine myself to the use of four amplifying rotary cutters to cut or trepan one complete stage of amplification, one or any number of cutters may be used to produce one amplifier or one complete stage of amplification and one or any number of amplifying sets may be used at the same time. I do not confine myself to the use of amplifying cutters only, common rotary cutters or compound cutters, with or without teeth, may be used, made of composition or metal. Rotary cutters may be slotted, grooved or drilled (37, as at Fig. 11), radially to form channels or portholes to correspond with channel portholes on hollow shafts (38, Figs. 1 and 15) to receive the cooling substance and lubricant for escapement and discharge by centrifugal force or pressure at the circumferential surface of cutters and the face of material engaged upon. The cutter (28) may be fitted with interchangeable flat faced discs (40), dome shaped or otherwise, of various sizes to act as a shoulder or flange (41) to the cutter (28) and so form a safety depth guage (40). Cutters (28) may be detachable for easy removal so that one only may be used as a master cutter, or a set of amplifiers may be mounted on one shaft as a master cutter when desired, by setting the teeth in amplifying order, or using one cutter only with amplifying teeth (21, Fig. 7).

Pan collectors (42, Fig. 1), with or without magnets (52) may be placed near cutters (28) with vanes underneath (43) to collect substance and cause reactance of radial discharge and cooling face of cutters. The trepan tool may have many ways for regulating depth of cut taken by cutters and many ways of supplying and controlling the necessary pressure for cutters on the face of material engaged, that is—advancing the cutters in relation to the material engaged. One of the said means is in self-contained form, self-advancing by mechanical means, the gear wheel (44) and housing (68) may be attached by screw threads, pins or the like (68A) to the main body (2) and connected by pinions (45) which are freely rotated on their axes on the member (45A), keyed to the centre axis and geared to the external housing which is internally geared (46) which is attached to the axis by threads. The said gear wheel (44) and external housing (46) so being connected together by reduction gearing or the like. A friction clutch (47) may be placed between gear (46) and axis (3), hand controlled, or otherwise, for engagement and so control the feed gearing on the main body, by turning threaded wheel or the like (69, Fig. 1) moves the clutch flange ring (47) until flanges (70 and 71) are gripped as one. That is, you slide the rotary body carrying the cutters on the axis by mechanical means, so varying the depth of the main body in relation to the axis (3) and the engaging material, so advancing the depth of cutters by reduction gearing at a fixed ratio per revolution or movement of the tool. I do not confine myself to this particular kind of clutch and gearing, but may use any suitable kind of common clutch and gearing.

The rotary cutters may be adjusted and set in any position in relation to the main body by turning the rotary gear housing which allows the rotary cutter or cutters therein, caged to rotate in any direction on the rotary body which carries it. Another form of cutter feed may be by threaded gearing, placed between the rotary body and the body, chuck or guide that is fixed or attached to the material so causing a parallel sliding movement according to the pitch of threads or fulcrums engaged. During rotary movement of the trepan tool, driving shafts and cutters and main body will rotate one in relation to the other according to their respective gear ratios and gears engaged. Rotary brushes, (39, Figs. 14 and 15), spiral shaped or otherwise, for keeping the cutting path clean may be used and may be detachable and mounted on driving shafts like rotary cutters.

Scraper brushes (39B) may be fitted in the main rotary body with fittings interchangeable with guides (23). The driving shafts that rotate or the spindles that carry the cutters may be placed and set off-set from the axial centre of main body to so advance the cutter in relation to the true circle of travel according to the requirements of the material engaged upon. That is—in some cases it will be necessary for the rotary cutters to rotate with their driving shaft centres set out of alignment with the true central axis on which the tool moves or rotates.

Figure 13:
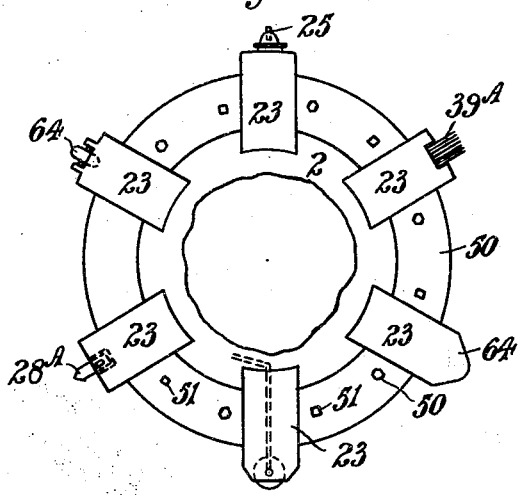
Fig. 13 shows plan of chuck showing cutters and guides mounted in position, with a second locking device.

The dome shaped, non-rotating carrier guide or chuck may have bracket extensions (55, Fig. 16) with arms or legs at one end and recesses to receive detachable fitments, adjustable jaws or the like, and said carrier and axis may be connected to engage the fulcrum rifle gearing for fixing the tool externally to the material engaged. The other end of dome may be attached to the central axis (3) and act as a controller and central guide, the said external non-rotating carrier guide may have bracket extensions (55, Fig. 16) and may carry electric brushes (57) and collecting gear and electric switches and power unit attachment as required. Another kind of guide is a depth guage guide (64, Figs. 1 and 8) one or any number may be fitted radially (59 and 31, Fig. 13) in the main rotary body (2) or in adjustable holders (23) attached to the main rotary body. The said depth guides may be in solid form (64) or with rollers (64A), any shape or angle and to travel on the surface in the cutting path of the newly cut material or otherwise and so act as a guide and safety depth guage for the cutters. The said guides may be detachable and adjustable in relation to the cutter and the main body (2) of the said tool.

The main body may be fitted with a chuck (50) or chucks, like common lathe chucks, detachable or otherwise with locking ring or rings (62A), self-centreing or otherwise, said chuck may carry fitments and be adjustable externally horizontally (50A) with a second locking device (51) to hold the sliding jaw and make the adjustment secure. The external carrier guide or chuck may carry fulcrum groove gearing (53) or the like, detachable, by threaded ring (53F) with non-rotary recess (53E), for grooving and rifling and the like, interchangeable for any pitch, to control the parallel or curve movement of the said main body. The other half of fulcrum groove gearing (53A) to be fitted to the main rotary body with non-rotary recess (53B) and locking ring or stud (53D and 53E). Said external solid guide may be in the form of a self-centreing chuck (54), internally expanding or externally contracting, said guide may also be fitted with a detachable guiding ring or rings (63) with locking ring (63A) and non-rotary recess (63B) to keep the tool central. The main body (2) may be in solid form for a given size or may use detachable fixed gauges like rings (62), with locking rings (62), with locking rings (62A) with non-rotary recesses (62B), one or any number may be fitted. One type of ring used may be an eccentric ring (61), internally to control the depth of cutters, by varying its position in relation to the cutters protruding. The rotary cutters may be adjusted externally (30B) for depth of cut taken by raising the cutters (30A) in relation to the main body that carries them. The detachable centre points may be in the form of rotary cutters (48) for making holes or boring.

The rotary brushes (39 and 39A) will sweep the path during operation. The said rotary cutters may be adjustable and set to rotate at any angle or in any direction in relation to the main body which carries them and may be mounted in an adjustable housing or housings (75A, 75B) mounted in the main rotary body (2). Said cutter being mounted in a rotary adjustable cage so placing the rotary cutter or cutters to rotate in any direction or position in relation to the main body which carries it or them.

I claim:

1. A trepan tool in self contained form comprising a cup shape radial cage, a power unit built therein, a central axis supporting said cage, an abutment gearing provided in the radial cage, a stationary gear forming part of the abutment gearing integral with the central axis, adjustable cutting means carried by said radial cage, means for securing the central axis on to the work, means for revolving the radial cage and the cutting means and means for advancing the radial cage forward.

2. A trepan tool comprising a cup shape radial cage, a hub integral therewith, a central spindle passing through said hub, adjustable cutting means carried by said radial cage, means for securing the central spindle to the work, means for revolving the radial cage and cutting means provided within the radial cage, and means for advancing the radial cage.

3. A trepan tool comprising a cup shape radial cage, a hub formed therein, an annular recess formed in the base of the radial cage, a spindle passing through said hub, an adjustable tool holder carried by said radial cage, a cutter carried by said holder, means for securing the spindle to the work, means for revolving the radial cage and cutting means provided within the radial cage, and means for advancing the radial cage.

4. A trepan tool comprising a cup shape radial cage, a hub formed therein, an annular recess formed in the base of said radial cage, a spindle passing through said hub, said radial cage rotatably mounted upon the spindle, and adjustable tool holder carried by the radial cage, a cutter secured to the tool holder, a base plate fixed to the lower end of the spindle connected to the work, means for revolving the radial cage and cutting means, and means for advancing the radial cage.

5. A trepan tool comprising a cup shape radial cage, a hub extending from the base within the cage, an electric motor on the periphery of said hub, an annular recess provided in the base of said radial cage, gearing mounted in said recess, a removable cover enclosing said gearing, intermediate gearing engaging with the gearing in said recess and electric motor respectively, adjustable tool holders carried by said radial cage, a cutter secured to each tool holder, a supporting plate, attached to the base of the spindle and means for advancing the radial cage.

6. A trepan tool comprising a cup shape radial cage, a helical groove provided on the periphery of said cage, a hub integral therewith, a spindle passing through said hub, a supporting plate attached to the base of the spindle, said radial cage revolving on the spindle, motors carried within the radial cage, adjustable tool holders carried by said radial cage, gear wheels within said radial cage engaging with the motors and tool holders respectively for revolving same, and means for advancing the radial cage.

7. A trepan tool comprising a cup shape radial cage, a helical groove provided on the periphery of said cage, a hub integral therewith, a spindle passing through said hub, a supporting plate attached to the base of the spindle, said radial cage revolving on the spindle, motors carried within the radial cage, adjustable tool holders carried by said radial cage, gear wheels within said radial cage engaging with the motors and tool holders respectively for revolving same, a stationary carrier provided with an internal cut helical groove engaging with the helical groove on the periphery of the radial cage for advancing same forward.

8. A trepan tool comprising a cup shape radial cage, a helical groove provided on the periphery, a hub formed within said cage, a spindle passing through said hub, a support attached to the base of the spindle, adjustable holders mounted in said radial cage, a depth gauge, a cutter, a brush and a lubricant carried by the respective adjustable holders, motors carried within the radial cage, gear wheels provided in said radial cage engaging with the motors, and a stationary carrier provided with an internal cut helical groove engaging with the helical groove on the periphery of the radial cage for advancing same forward.

9. A trepan tool comprising a cup shape radial cage, a helical groove provided on the periphery, a hub formed within said cage, a spindle passing through said hub, a support attached to the base of the spindle, adjustable holders mounted in said radial cage, a floating spindle provided in the tool holder, a control shaft passing through the radial cage, worm gearing provided for connecting the control shaft to the floating spindle, motors carried within the radial cage, gear wheels provided on said radial cage engaging with the motors, and a stationary carrier provided with an internal cut helical groove engaging with the helical groove on the periphery of the radial cage for advancing same forward.

10. A trepan tool comprising a cup shape radial cage, a helical groove provided on the periphery, a hub formed within said cage, a spindle passing through said hub, a support attached to the base of the spindle, adjustable tool holders mounted in said radial cage, a depth gauge, a cutter, a brush and a lubricant carried by the respective adjustable tool holders, motors carried within the radial cage, gear wheels provided in said radial cage engaging with the motors, a reduction gear and clutch mechanism provided on the upper end of the hub within the radial cage for varying its speed, and a stationary carrier provided with an internal cut helical groove engaging with the helical groove on the periphery of the radial cage for advancing same forward.

11. A trepan tool comprising a cup shape radial cage, a helical groove provided on the periphery, a hub formed within said cage, a spindle passing through said hub, a support attached to the base of the spindle, adjustable tool holders mounted in said radial cage, a depth gauge, a cutter, a scraper brush and a lubricant carried by the respective adjustable holders, magnetic pan collectors carried by the radial cage, motors carried within the radial cage, gear wheels provided in said radial cage engaging with the motors, a reduction gear and clutch mechanism provided on the upper end of the hub within the radial cage for varying its speed, and a stationary carrier provided with an internal cut helical groove engaging with the helical groove on the periphery of the radial cage for advancing same forward.

12. A trepan tool comprising a cup shape radial cage, a helical groove provided on the periphery, a hub formed within said cage, a spindle passing through said hub, a support attached to the base of the spindle, adjustable tool holders mounted in said radial cage, a depth gauge, a cutter, a scraper brush and a lubricant carried by the respective adjustable holders, guides provided on the periphery of the radial cage to fit the bore, motors carried within said radial cage, gear wheels provided in said radial cage engaging with the motors, a reduction gear and clutch mechanism provided on the upper end of the hub within the radial cage for varying its speed, and a stationary carrier provided with an internal cut helical groove engaging with the helical groove on the periphery of the radial cage for advancing same forward.

13. A trepan tool comprising a cup shape radial cage, a helical groove provided on the periphery, a hub formed within said cage, a spindle passing through said hub, a support attached to the base of the spindle, adjustable tool holders mounted in said radial cage, a chuck carried by said radial cage, radially adjustable jaws provided in said chuck, cutters, guides and brushes carried by said jaws, a second locking device for securing each adjustable jaw in position, guides provided on the periphery of the radial cage to fit the bore, motors carried within said radial cage, gear wheels provided in said radial cage, engaging with the motors, a reduction gear and clutch mechanism provided on the upper end of the hub within the radial cage for varying its speed, and a stationary carrier provided with an internal cut helical groove engaging with the helical groove on the periphery of the radial cage for advancing same forward.

ERNEST WILLIAMS.